H. DAVEY.
SLUICE AND FLOOD GATE.
APPLICATION FILED DEC. 1, 1911.
1,040,158.
Patented Oct. 1, 1912.
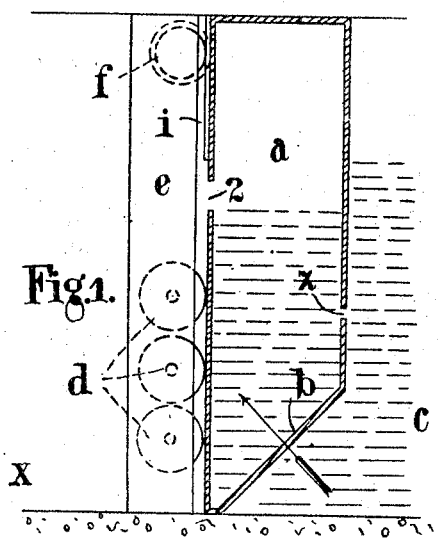
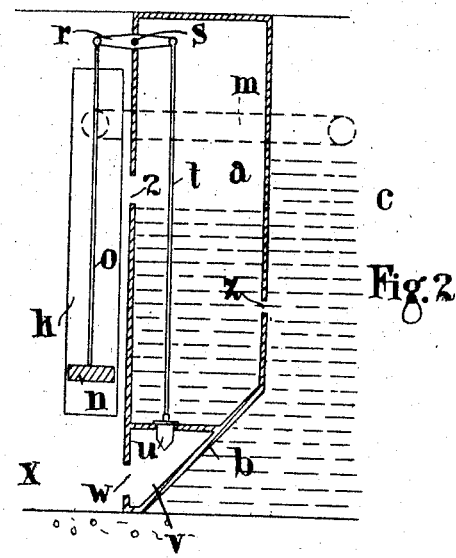
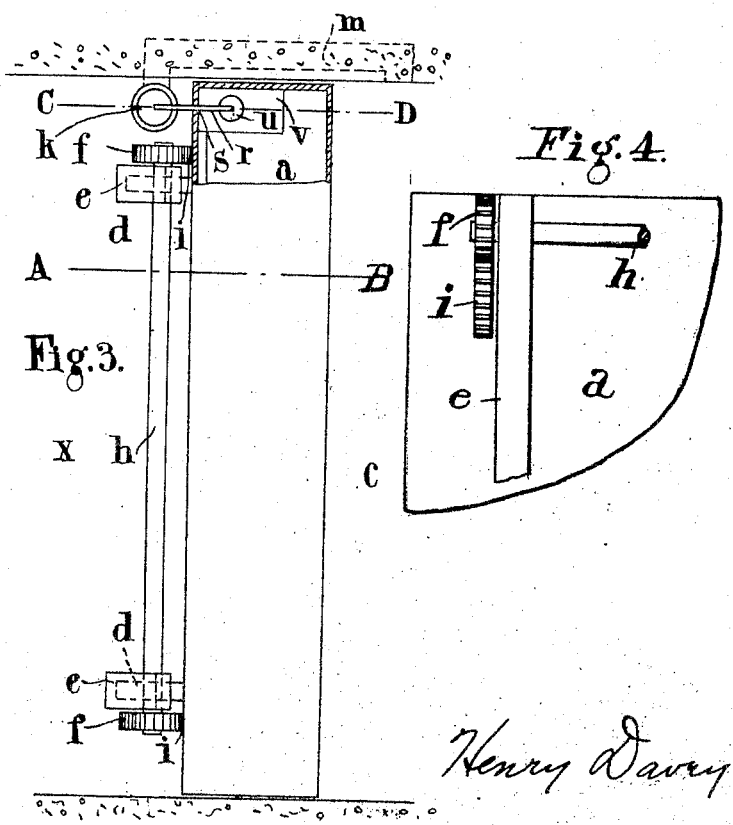

UNITED STATES PATENT OFFICE.

HENRY DAVEY, OF CONAWAYS, EWELL, ENGLAND.

SLUICE AND FLOOD-GATE.

1,040,158.  Specification of Letters Patent.  Patented Oct. 1, 1912.

Application filed December 1, 1911. Serial No. 663,469.

*To all whom it may concern:*

Be it known that I, HENRY DAVEY, a subject of the King of Great Britain and Ireland, and a resident of Conaways, Ewell, in the county of Surrey, England, have invented certain new and useful Sluices and Flood-Gates, of which the following is a specification.

This invention relates to sluices or flood gates and particularly to those which rise or fall automatically in accordance with changes of level in the head water.

With gates or sluices which rise by rise of head water alone, the rise of the gate must always be less than the rise of head water because of frictional and other resistances.

The object of the present invention is in general to prevent as far as possible rise of water level in water courses, reservoirs and the like and in particular to secure a rise of gate which may be equal to or even much greater than the rise of head water.

To these ends the present invention consists in a hollow sluice or flood gate provided with automatic means responsive to change of level of head water and acting so that water is admitted to the interior of the gate to close it and discharged therefrom to open it.

The invention also consists in the improved sluice or flood gates and adjuncts hereinafter described.

Referring to the accompanying drawings:—Figures 1 and 2 are cross sections on the line A—B C—D respectively of Fig. 3, while Fig. 3 shows a plan view partly in section and Fig. 4 a front view of one end of the gate.

The drawings are of a diagrammatic or conventional nature, corresponding parts in the different figures being denoted by the same reference symbols.

In carrying the invention into effect according to one form, the float gate or sluice, $a$ takes the form of a hollow tank, the bottom, $b$, of which is inclined as shown. This tank is held by the pressure of the head water, $c$, against rollers, $d$, rotatably mounted in the standards, $e$, while to maintain parallelism of the tank and prevent lateral tilting, cog-wheels $f$ $f$ are provided mounted on the common shaft, $h$ also rotatable in the standards, $e$, these cog-wheels engaging with racks, $i$, $i$, fixed to the sluice. Alternatively the shaft $h$, with its cog-wheels may be mounted on the sluice and the racks, $i$, on the standards.

In order that the operation of the sluice may be automatic, a cylinder, $k$, is fixed to the side wall or the like, its upper part being connected by a duct, $m$, to the head water, $c$; a loose fitting piston, $n$, works in the cylinder and is connected by the rod, $o$, to one end of a rocking lever, $r$, pivoted to the sluice wall at, $s$, the other end of this lever being connected by the rod, $t$, to the valve, $u$. A special chamber, $v$, is provided in the upper wall of which the valve $u$, can be seated while an outlet, $w$, to the tail water, $x$, is arranged as shown. The main body of the sluice is provided with a small inlet, $z$, and an overflow, 2.

The action of the automatic gate described is as follows:—Assuming the gate and its mechanism to be in the condition shown in Fig. 2, a rise of the head water $c$ will cause water to flow through the duct, $m$, into the cylinder, $k$, thereby depressing the piston, $n$, and opening the valve, $u$. The proportions are such that water flows out of the gate past the valve faster than it can flow in by the inlet aperture, $z$; the buoyancy of the gate is thus increased independently of the movement thereof, and the gate therefore rises owing to the pressure of the head water on the inclined floor $b$ (see arrow in Fig. 1) until a balance is obtained. If the head water subsequently falls and flow through the duct, $m$, ceases, the water in the cylinder will leak out pass the piston and the valve, $u$, will close owing to its excess of weight provided in any suitable manner. Water flowing through the inlet, $z$, will then fill the gate to the overflow, 2, and cause it to close.

The extent to which the gate rises with rise of head water is a question of design, for example, a rise in head water of say three inches which would not cause the direct operated gate referred to above to open at all, may be made to raise the present gate to the extent of one foot or more. Thus with the gate empty of water it might float with two feet of its depth above the surface of the head water; when full of water to the overflow the top of the gate might be, say, one foot above the duct, $m$. A rise then in the head water from a position just clear of the duct through the few inches required to operate the piston, $n$, would empty the gate of water and by thus increasing its buoyancy cause it to rise through one foot or so, the exact amount depending on the frictional resistance opposing its movement.

Although one specific form of the invention has been described in detail by way of example, it will nevertheless be evident that the principle involved may be applied in a variety of different structural embodiments.

Having now described my invention, what I claim as new and desire to secure by Letters Patent is:—

1. In combination, a float sluice or flood gate and automatic means responsive to rise of head water for increasing the buoyancy of said gate independently of the movement thereof to open the same.

2. In combination, a float sluice or flood gate and automatic means responsive to rise of head water for increasing the buoyancy of said gate independently of the movement thereof to open the same to an extent at least as great as said rise of head water.

3. In combination, a float sluice or flood gate and automatic means responsive to rise of head water for increasing the buoyancy of said gate independently of the movement thereof to open the same to an extent greater than said rise of head water.

4. In combination, a float sluice or flood gate having an inlet and an outlet; means controlling said outlet and automatic means responsive to rise of head water for opening said outlet-controlling means.

5. In combination, a float sluice or flood gate having an open inlet from the head water, an overflow to the tail water and an outlet together with means for controlling said outlet.

6. In combination, a sluice or flood gate having a head and a tail wall; stationary supporting means together with rack means and a plurality of spaced pinions rigidly connected and co-acting with said rack means, one of said co-acting parts being mounted on one of said sluice walls and the other of said co-acting parts being mounted on said supporting means.

7. In combination, a sluice or flood gate having an inlet, an overflow and an outlet operatively larger than said inlet and automatic means for controlling said outlet.

8. In combination, a sluice or flood gate having an inlet, an overflow and an outlet; a valve controlling said outlet; a stationary cylinder; a duct connecting said cylinder to the head water; a piston working in said cylinder and means operatively connecting said piston and said valve.

9. A hollow sluice or flood gate having vertical front and back walls and a floor portion sloping upward from said front wall to said back wall.

10. In combination, a float sluice or flood gate closed by weight of contained water and automatic means responsive to rise of head water for lifting said gate, said means including a valved outlet for said contained water.

11. In combination, a float sluice or flood gate having an opening to the head water; an outlet and automatic means responsive to fall of head water for closing said outlet and thereby decreasing the buoyancy of said gate by in-flow of water through said opening.

12. In combination, a float sluice or flood gate having ducts connecting with both the head and tail water and an overflow together with means for controlling one of said ducts.

13. In combination, a float sluice or flood gate having ducts connecting with both the head and tail water and an overflow; means controlling one of said ducts and automatic means responsive to change of level of head water for actuating said controlling means.

14. In combination, a hollow sluice or flood gate having ducts to the head and tail water, one of said ducts being open; and valve means controlling the other of said ducts.

15. In combination, a hollow sluice or flood gate having ducts to the head and tail water, one of said ducts being open; together with automatically operated valve means for controlling the other of said ducts.

In testimony whereof I have signed my name to this specification in the presence of two subscribing witnesses.

HENRY DAVEY.

Witnesses:
 BERTRAM H. MATTHEWS,
 P. A. OUTHWAITE.